(12) United States Patent
Strahs et al.

(10) Patent No.: US 8,780,738 B2
(45) Date of Patent: Jul. 15, 2014

(54) METHOD AND APPARATUS FOR SUPPORTING ENTERPRISE ADDRESSING IN NETWORKS

(75) Inventors: Leopold Strahs, Williamsburg, VA (US); Saul Fishman, Highland Park, NJ (US); Min Lu, Freehold, NJ (US); Stephanie Parlamas, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 964 days.

(21) Appl. No.: 12/121,134

(22) Filed: May 15, 2008

(65) Prior Publication Data
US 2009/0285199 A1    Nov. 19, 2009

(51) Int. Cl.
*H04L 12/26* (2006.01)
(52) U.S. Cl.
USPC ...... 370/252; 370/395.21; 370/329; 370/330; 370/333

(58) Field of Classification Search
None
See application file for complete search history.

(56) References Cited

U.S. PATENT DOCUMENTS

| | | | |
|---|---|---|---|
| 7,248,682 B1 * | 7/2007 | Oran | 370/395.52 |
| 7,706,401 B2 * | 4/2010 | Bae et al. | 370/466 |
| 2007/0019545 A1 * | 1/2007 | Alt et al. | 370/230 |

* cited by examiner

*Primary Examiner* — Kibrom T Hailu
*Assistant Examiner* — Zewdu A Beyen

(57) ABSTRACT

A method and apparatus for supporting enterprise addressing in networks are disclosed. For example, the method creates a Domain Name System (DNS) service record and loading said DNS service record in a public DNS server for a customer, wherein the DNS service record supports a mapping of a domain name of the customer to a sub-domain name of a service provider. The method receives a call destined to a customer endpoint device for the customer; and forwards the call to the customer in accordance with the DNS service record.

20 Claims, 4 Drawing Sheets

METHOD AND APPARATUS FOR SUPPORTING ENTERPRISE ADDRESSING IN NETWORKS

The present invention relates generally to communication networks and, more particularly, to a method and apparatus for supporting enterprise addressing in networks, e.g., Internet Protocol (IP) networks, Voice over Internet Protocol (VoIP) networks, and the like.

BACKGROUND OF THE INVENTION

An enterprise customer may implement a Private Numbering Plan (PNP) to enable its employees in various geographical locations to communicate with each other by dialing extension numbers rather than standard telephone numbers such as E.164 standard numbers. That is, PNP enables each phone in each enterprise location to reach any other phone in any other of the enterprise's locations by dialing an extension number. For example, employees of an enterprise customer may be able to reach each other by dialing a four digit extension number instead a 10 digit number.

It should be noted that E.164 is an ITU-T recommendation which defines the international public telecommunication numbering plan, i.e., for formatting telephone numbers such that they may be signaled across one or more networks. The E.164 format includes a country code and subsequent digits, but not the international prefix. However, an extension number in accordance with a PNP is not associated with an E.164 standard number and no Telephone Number Mapping (ENUM) query may be issued to resolve such number. ENUM is a standard protocol defined by the Internet Engineering Task Force (IETF) for translating phone numbers that are in E.164 format to Internet domain names and vice versa such that a Domain Name Server (DNS) may resolve the addresses for E.164 numbers the same way it resolves traditional website domains. For example, ENUM may be used to transform a phone, a fax or a pager number into a URI (Uniform Resource Identifier).

In addition, in VoIP networks, a user may be assigned a username, e.g., johndoe@companyC.com, without being assigned a telephone number. Unfortunately, a caller from outside of the enterprise customer's network with knowledge of a username or an extension number is unable to reach the number directly. For example, a caller may have to dial a main number for the company (switchboard) and ask an operator to connect the call to the intended extension number.

SUMMARY OF THE INVENTION

In one embodiment, the present invention discloses a method and apparatus for supporting enterprise addressing in networks, e.g., packet networks. For example, the method creates a Domain Name System (DNS) service record and loading said DNS service record in a public DNS server for a customer, wherein the DNS service record supports a mapping of a domain name of the customer to a sub-domain name of a service provider. The method receives a call destined to a customer endpoint device for the customer; and forwards the call to the customer in accordance with the DNS service record.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for supporting enterprise addressing in networks. Although the present invention is discussed below in the context of Voice over Internet Protocol (VoIP) networks, the present invention is not so limited. Namely, the present invention can be applied to packet networks in general, e.g., Service over Internet Protocol (SoIP) networks, wireless networks, and the like.

Figure 1:
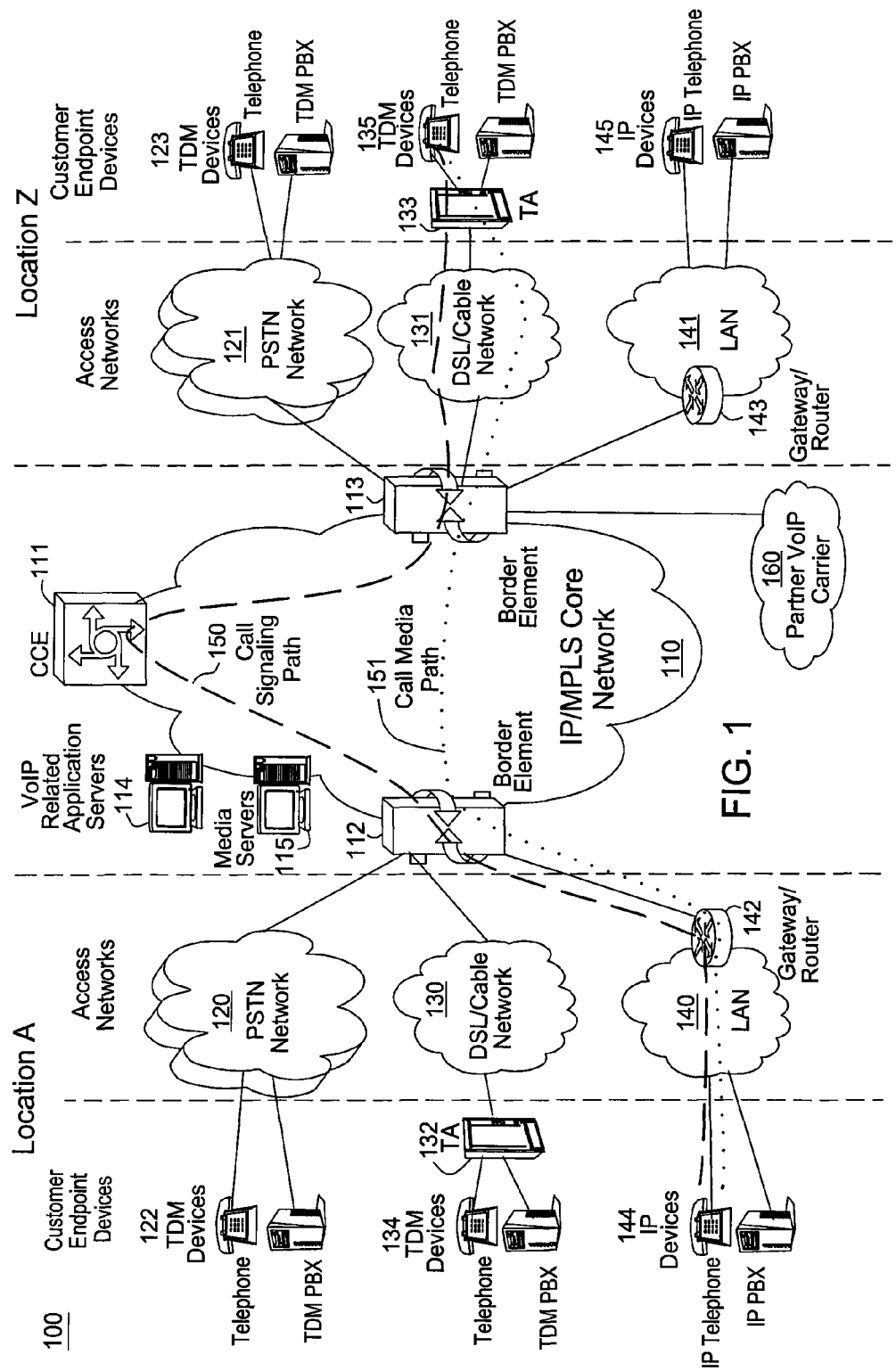
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address, and so on.

In order to illustrate how the different components operate to support a VoIP call, the following call scenario is used to illustrate how a VoIP call is setup between two customer endpoints. For example, a customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different. This is because, once a call has been setup between two endpoint devices, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, trans-coding, and Interactive Voice Response (IVR) messages for VoIP service applications. The media servers also interact with customers for media session management to accomplish tasks such as process requests.

The above IP network is described to provide an illustrative environment in which packets for voice and data services are transmitted on VoIP networks. An enterprise customer may subscribe to a VoIP service that supports enterprise addressing. For example, the enterprise customer may wish callers from outside of the enterprise network to be able to use extension numbers or usernames to reach a particular destination in the enterprise network.

To illustrate, an enterprise customer may implement a Private Numbering Plan (PNP) to enable its employees in various geographical locations to communicate with each other by dialing extension numbers rather than E.164 standard numbers. However, some extension numbers may not be associated with an E.164 standard number. In turn, the DNS server is not able to issue an ENUM query to resolve such numbers that are not in E.164 format. A caller from outside of the enterprise customer's network with knowledge of a username or an extension number is then unable to reach the number by dialing over the public network. To address this criticality, the current invention provides a method and an apparatus for supporting enterprise addressing within a service provider's network.

Figure 2:
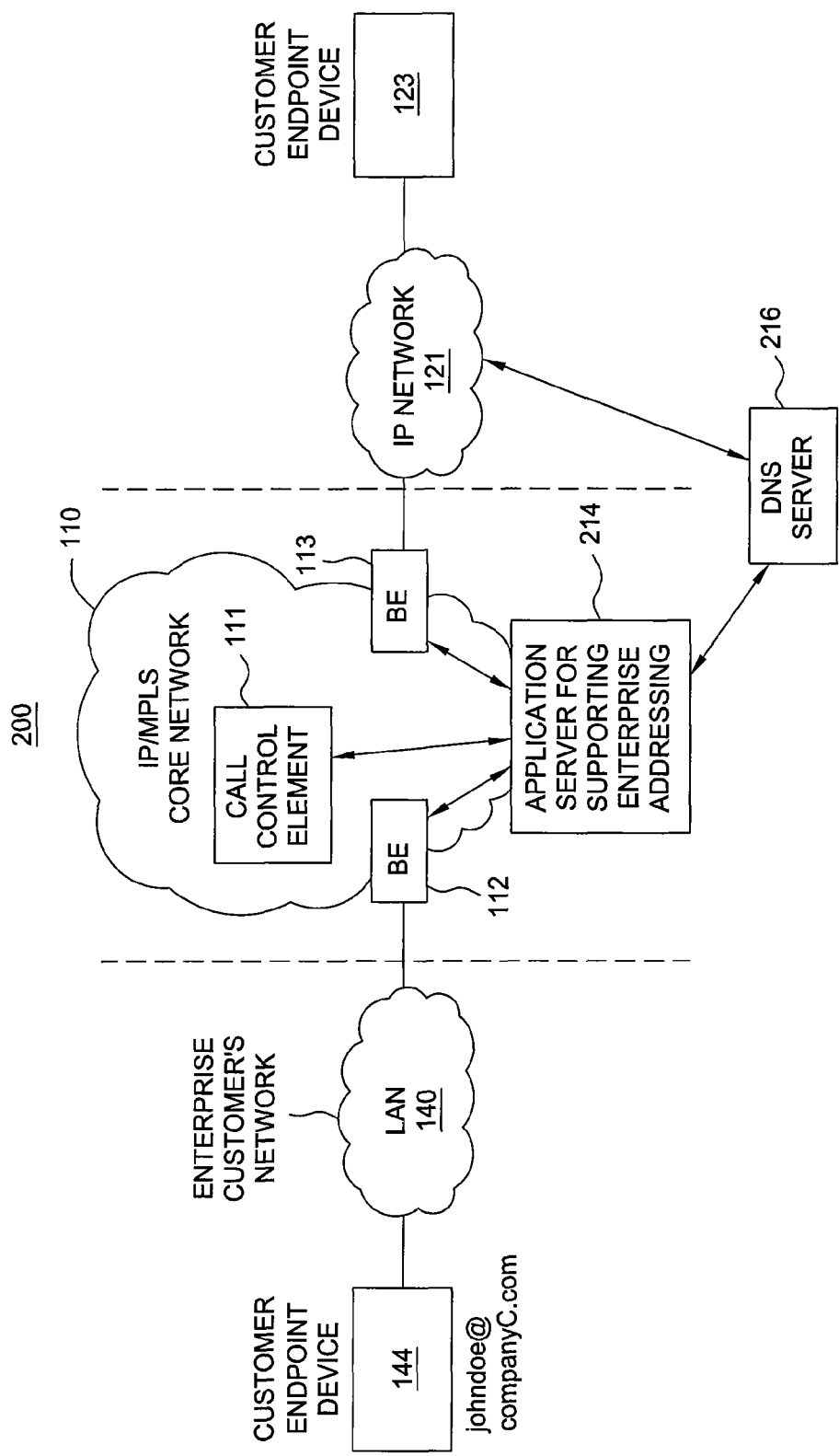
FIG. 2 illustrates an exemplary network in accordance with one embodiment of the current invention for supporting enterprise addressing.

FIG. 2 illustrates an exemplary network 200 in accordance with one embodiment of the current invention for supporting enterprise addressing. A customer endpoint device 144 is receiving VoIP services from an IP/MPLS core network 110 via a LAN 140 and a border element 112. The customer endpoint device 123 is receiving services from the IP/MPLS core network 110 via PSTN 121 and a border element 113. The LAN 140 is administered by the enterprise customer. In one embodiment, the IP/MPLS core network 110 provides an application server 214 for interacting with enterprise customers and supporting enterprise addressing.

For example, an enterprise customer may wish to use its own domain name as the host of the SIP Uniform Resource Identifier (URI) instead of the domain name of the service provider. The service provider may host an enterprise customer's domain name and map the hosted domain name to a sub-domain to support the enterprise's addressing. The service provider then maps the customer's domain name to a service provider sub-domain. The method then creates a DNS service record mapping the enterprise's domain name to the service provider's sub-domain for routing. The DNS SRV record (service record) is loaded to a public DNS server 216 to map the enterprise customer's domain name to the service provider's subdomain. For example, the application server 214 receives a request from an enterprise customer to support enterprise addressing. The application server 214 has the mapping between the customer's domain name and a service provider's sub-domain. When a call for a destination in the enterprise customer's network comprising the enterprise customer's domain name is received, after the public DNS query/response, it routes to the service provider's network. The application server 214 is able to properly forward the call to the customer.

In one embodiment, the method may also uniquely identify an extension number or a customer endpoint device by using a combination of: a customer domain name, an extension number, and/or a username. Namely, the application server 214 will need to obtain the customer's private extension numbers and usernames. Note that if the enterprise customer is already a subscriber of a PNP service, then the service provider may already have the list of private extension numbers. In that case, the names (usernames) may be the additional information needed to reach each customer endpoint device in the enterprise network.

For example, if an enterprise customer with a domain name companyC has a username johndoe, the enterprise may wish calls to johndoe@companyC.com to be routed via a service provider A that support's the enterprise's addressing. The application server may then create the DNS service record mapping companyC.com to companyC.serviceproviderA.net and load the created record in a public DNS server. The application server then keeps a record of an extension associated with johndoe. Other networks may then route calls towards the enterprise customer via the service provider A. For example, if the customer endpoint device 123 originates a call towards johndoe@companyC.com and johndoe is using customer endpoint device 144, the originating VOIP network performs the DNS query for "johndoe@companyC.com" to the public DNS server and get a response with company C's service provider's subdomain "johndoe@companyC.serviceproviderA.net". The originating VOIP network then routes the call to the company C's service provider network. The application server 214 in company C's service provider network determines that the address is recognized as a valid extension. Since the application server 214 (located in the service provider A's IP/MPLS core network) has knowledge of the private numbering plan for the enterprise customer, it is able to convert the address johndoe@companyC.serviceproviderA.net back to johndoe@companyC.com. The call may then be routed towards the customer endpoint device 144.

If the call is to be routed to an extension number, the extension number may be used instead of a username. That is, the application server may convert johndoe@companyC.serviceproviderA.net to an extensionnumber@companyC.com.

In one embodiment, the service provider may map a domain name to a sub-domain that indicates a service context and/or a service provider. For example, the application server/public DNS server may create the DNS service record mapping companyC.com to companyC.servicename.serviceproviderA.net. A call to johndoe@companyC.servicename.serviceproviderA.net would then indicate a call to username johndoe at companyC via a particular service type (e.g. VoIP) provided by the service provider A.

In one embodiment, the service provider may map a domain name to a sub-domain that indicates one or more of: a service provider, a service context, and/or a geographical area. For example, the service provider may create DNS records mapping enterprise domain names to service provider sub-domain names that indicate a geographical location. For example, companyC may have locations in 10 cities. The sub-domain may be created with an indication of which city, e.g., companyC.cityname.serviceproviderA.net.

In one example, a call originates for johndoe@companyC.com from a customer receiving services from the service provider A. The call control element in the service provider A's network completes the origination processing to route the call. No ENUM query is performed because the call is not for a telephone number. The call control element uses a DNS lookup for the service record and retrieves a mapping of the domain name companyC.com to companyC.serviceproviderA.net. The call control element then recognizes companyC.serviceproviderA.net as a domain which is hosted by the service provider A's IP/MPLS core network. The call control element then forwards the call to a call control element that handles the destinations for companyC.

In one example, a call originates for johndoe@companyC.com from a source address other than addresses served by the service provider A. Since the call is originating in another network, the call is routed in the originating service provider's network based on the host. The SIP server performs a DNS lookup to determine how to route a SIP session over UDP to companyC.com. The result of the DNS service query maps companyC.com to companyC.serviceproviderA.net. A new query is then issued for the DNS service record on the new domain, i.e. companyC.serviceproviderA.net. The query retrieves a host name and an IP address of a call control element located within service provider A's network. The call is then routed towards the call control element in service provider A's network.

In one embodiment, a query that originates outside the service provider network may result in a DNS resolution that provides an IP address of a border element used to reach the intended call control element. For example, the DNS resolution for the above example may retrieve the IP address of BE 113 instead of the IP address of the call control element 111. The call may then be handled by the BE.

Figure 3:
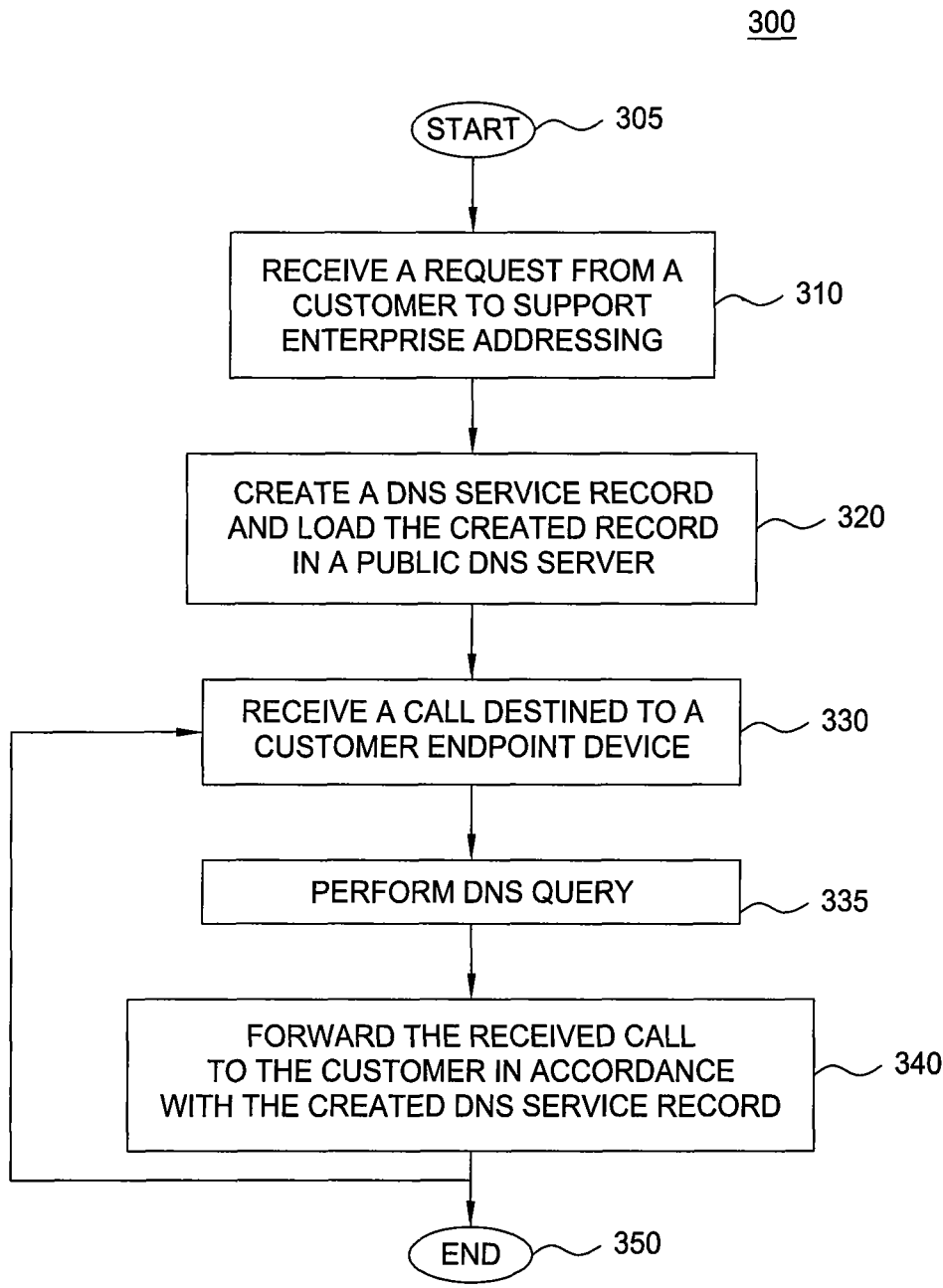
FIG. 3 illustrates a flowchart of a method for supporting enterprise addressing.

FIG. 3 illustrates a flowchart of a method 300 for supporting enterprise addressing. For example, method 300 may be implemented by the application server 214. Method 300 starts in step 305 and proceeds to step 310.

In step 310, method 300 receives a request from a customer to support enterprise addressing. For example, a customer may subscribe to a service that supports enterprise addressing. In one embodiment, the customer may also provide the service provider a list of customer endpoint usernames and extensions.

In step 320, method 300 creates a DNS service record and loads the created record into one or more public DNS servers, wherein the created DNS service record supports a mapping of the customer's domain name to the service provider's sub-domain. For example, the method may map companyname.com to companyname.serviceprovidername.com.

In step 330, method 300 receives a call destined to a customer endpoint device. For example, the method receives a call from a source in another network that is routed based on the DNS service record.

In step 335, the originating network performs the DNS query to the public DNS server and as a result, it converts companyname.com to companyname.serviceprovidername.com. Then it routes the call to the terminating service provider network.

In step 340, method 300 forwards the received call to the customer in accordance with the created DNS service record. For example, the service provider may forward the call to a server in the enterprise customer's network that may have knowledge of the particular endpoint device (e.g., an extension number or a user name). The method then ends in step 350 or it may return to step 330 to continue receiving other calls.

In one embodiment, the method may have knowledge of customer endpoint extensions and usernames. The method may then first correlate the call with a specific customer endpoint device in the enterprise network, and then route the call accordingly to the specific customer endpoint device.

In one embodiment, the method may also associate a service in delivering the call to the customer endpoint device. For example, the customer may have multiple endpoint devices, e.g., a cell phone, a pager, a land based device, and the like and may wish the call to be forwarded to the user's current location. The method may then associate a service, e.g., a follow me service, a call forward service, and the like, such that the user is able to receive the call at his/her current location.

Although the current invention is illustrated above using SIP protocol, those skilled in the art would realize that the present method may be implemented using other protocols, e.g., H.323 and the like.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
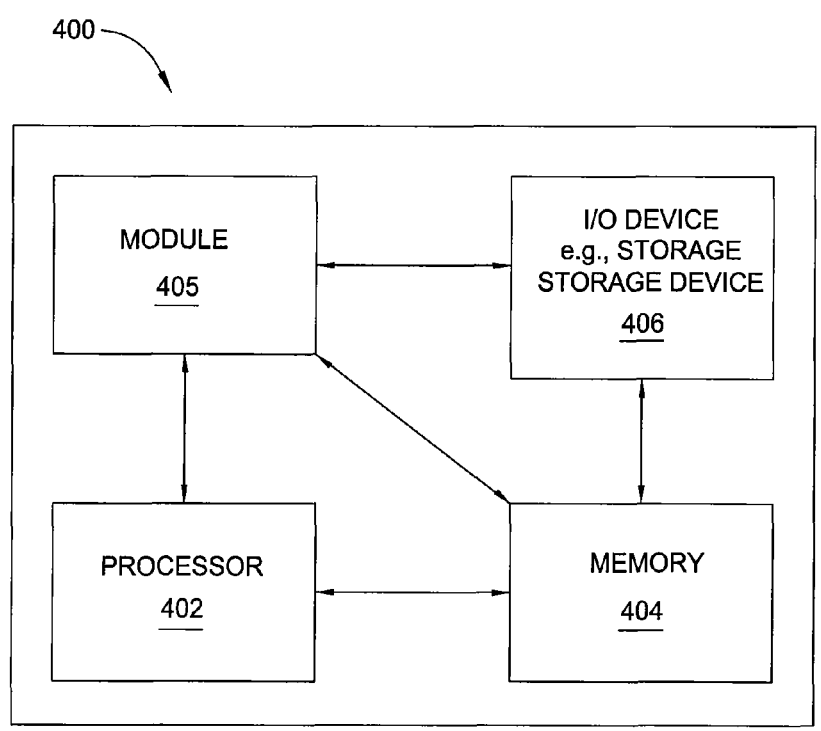
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for supporting enterprise addressing, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for supporting enterprise addressing can be loaded into memory 404 and executed by processor 402 to implement the functions as discussed above. As such, the present method 405 for supporting enterprise addressing (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for supporting enterprise addressing, comprising:
    creating, via a processor, a domain name system service record and loading the domain name system service record in a public domain name system server for a customer, wherein the domain name system service record supports a mapping of a domain name of the customer to a sub-domain name of a service provider and a service context;
    receiving, via the processor, a call destined to a customer endpoint device for the customer, wherein the call is directed to the sub-domain name of the service provider; and
    forwarding, via the processor, the call to the customer in accordance with the domain name system service record.

2. The method of claim 1, wherein the customer provides the service provider with a list of customer endpoint usernames.

3. The method of claim 1, further comprising:
    correlating the call with a first customer endpoint device in a network of the customer; and
    routing the call to the first customer endpoint device.

4. The method of claim 1, further comprising:
    associating a service in delivering the call.

5. The method of claim 4, wherein the associating the service in delivering the call comprises delivering the call to a current location of the customer.

6. The method of claim 1, wherein the mapping comprises a mapping of the domain name of the customer to the sub-domain name that indicates a geographical area.

7. The method of claim 1, wherein the forwarding of the call to the customer in accordance with the domain name system service record is based on an extension number.

8. A non-transitory computer-readable medium storing a plurality of instructions which, when executed by a processor, cause the processor to perform operations for supporting enterprise addressing, the operations comprising:
    creating a domain name system service record and loading the domain name system service record in a public domain name system server for a customer, wherein the domain name system service record supports a mapping of a domain name of the customer to a sub-domain name of a service provider and a service context;
    receiving a call destined to a customer endpoint device for the customer, wherein the call is directed to the sub-domain name of the service provider; and
    forwarding the call to the customer in accordance with the domain name system service record.

9. The non-transitory computer-readable medium of claim 8, wherein the customer provides the service provider with a list of customer endpoint usernames.

10. The non-transitory computer-readable medium of claim 8, further comprising:
    correlating the call with a first customer endpoint device in a network of the customer; and
    routing the call to the first customer endpoint device.

11. The non-transitory computer-readable medium of claim 8, further comprising:
    associating a service in delivering the call.

12. The non-transitory computer-readable medium of claim 11, wherein the associating the service in delivering the call comprises delivering the call to a current location of the customer.

13. The non-transitory computer-readable medium of claim 8, wherein the mapping comprises a mapping of the domain name of the customer to the sub-domain name that indicates a geographical area.

14. The non-transitory computer-readable medium of claim 8, wherein the forwarding of the call to the customer in accordance with the domain name system service record is based on an extension number.

15. An apparatus for supporting enterprise addressing, comprising:
 a processor; and
 a computer-readable medium in communication with the processor, storing a plurality of instructions which, when executed by the processor, cause the processor to perform operations, the operations comprising:
  creating a domain name system service record and load the domain name system service record in a public domain name system server for a customer, wherein the domain name system service record supports a mapping of a domain name of the customer to a sub-domain name of a service provider and a service context;
  receiving a call destined to a customer endpoint device for the customer, wherein the call is directed to the sub-domain name of the service provider; and
  forwarding the call to the customer in accordance with the domain name system service record.

16. The apparatus of claim 15, wherein the customer provides the service provider with a list of customer endpoint usernames.

17. The apparatus of claim 15, further comprising:
 correlating the call with a first customer endpoint device in a network of the customer; and
 routing the call to the first customer endpoint device.

18. The apparatus of claim 15, further comprising:
 associating a service in delivering the call.

19. The apparatus of claim 18, wherein the associating further associates the service in delivering the call by delivering the call to a current location of the customer.

20. The apparatus of claim 15, wherein the forwarding the call to the customer in accordance with the domain name system service record is based on an extension number.

* * * * *